US008745330B2

(12) United States Patent  (10) Patent No.: US 8,745,330 B2
Bhogal et al.  (45) Date of Patent: *Jun. 3, 2014

(54) TECHNIQUE FOR IMPROVING REPLICATION PERSISTANCE IN A CACHING APPLICANCE STRUCTURE

(75) Inventors: Kulvir Singh Bhogal, Pflugerville, TX (US); Nitin Gaur, Round Rock, TX (US); Christopher Douglas Johnson, Rochester, MN (US); Todd Eric Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/208,422

(22) Filed: Aug. 12, 2011

(65) Prior Publication Data

US 2013/0041971 A1 Feb. 14, 2013

(51) Int. Cl.
*G06F 13/00* (2006.01)
*G06F 9/26* (2006.01)

(52) U.S. Cl.
USPC ............ 711/118; 711/103; 711/202

(58) Field of Classification Search
USPC .................. 711/103, 202
See application file for complete search history.

(56) References Cited

U.S. PATENT DOCUMENTS

| 5,586,291 | A  | * | 12/1996 | Lasker et al. ............. 711/113 |
| 7,051,174 | B2 |   | 5/2006  | Ash et al. |
| 7,293,196 | B2 |   | 11/2007 | Hicken et al. |
| 7,613,877 | B2 | * | 11/2009 | Shimozono et al. ......... 711/113 |
| 2003/0187861 | A1 | * | 10/2003 | Lubbers et al. ............. 707/102 |
| 2004/0148486 | A1 | * | 7/2004  | Burton ..................... 711/202 |

* cited by examiner

*Primary Examiner* — April Y Blair
*Assistant Examiner* — Trang Ta
(74) *Attorney, Agent, or Firm* — Patents on Demand P.A.; Brian K. Buchheit; Scott M. Garrett

(57) ABSTRACT

A method for improving replication persistence in a caching appliance structure can begin when a primary catalog service receives a command to instantiate a data partition. The primary catalog service can manage a collective of caching appliances in a networked computing environment. The data partition can include a primary shard and at least one replica shard. The primary shard of the data partition can be stored within a memory space of a first caching appliance. The at least one replica shard of the data partition can be stored within a non-volatile storage space of a second caching appliance. The first and the second caching appliances can be separate physical devices. The memory space of the second caching appliance that could have been used to store the at least one replica shard can be available for storing primary shards for other data partitions, increasing the capacity of the collective.

20 Claims, 5 Drawing Sheets

600

```
┌─────────────────────────────────────┐
│ Caching appliance cluster experiences a │
│ failure resulting in the loss of primary │
│ shards stored in memory             │
│                                 605 │
└─────────────────────────────────────┘
                  │
                  ▼
┌─────────────────────────────────────┐
│ Caching appliance cluster recovers from the │
│ failure                             │
│                                 610 │
└─────────────────────────────────────┘
                  │
                  ▼
┌─────────────────────────────────────┐
│ Primary improved catalog service re- │
│ instantiates primary shards         │
│                                 615 │
└─────────────────────────────────────┘
                  │
                  ▼
┌─────────────────────────────────────┐
│ Dynamically allocates memory of each │
│ caching appliance hosting a replica shard │
│                                 620 │
└─────────────────────────────────────┘
                  │
                  ▼
┌─────────────────────────────────────┐
│ Loads the replica shards into the allocated │
│ memory                              │
│                                 625 │
└─────────────────────────────────────┘
                  │
                  ▼
┌─────────────────────────────────────┐
│ Promotes the loaded replica shards to │
│ primary shards                      │
│                                 630 │
└─────────────────────────────────────┘
                  │
                  ▼
┌─────────────────────────────────────┐
│ Identifies other caching appliance to hold │
│ the replica shards for the data partitions │
│                                 635 │
└─────────────────────────────────────┘
                  │
                  ▼
┌─────────────────────────────────────┐
│ Stores the replica shards of the primary │
│ shards to the NVS of the identified caching │
│ appliances                          │
│                                 640 │
└─────────────────────────────────────┘
```

TECHNIQUE FOR IMPROVING REPLICATION PERSISTANCE IN A CACHING APPLICANCE STRUCTURE

BACKGROUND

The present invention relates to the field of dynamic caching and, more particularly, to a technique for improving replication persistence in a caching appliance structure.

Caching appliances provide an effective means for improving system performance with regards to data that is frequently accessed. Using a cluster of multiple caching appliances (i.e., two or more caching appliances networked to function as a single cache), further provides high availability of the cached data. As shown in system 100 of FIG. 1, a typical caching appliance cluster 105 stores a set of data, referred to as a data partition 140 and 150, as a primary shard 143 and 153 and a replica shard 147 and 157 that are dispersed between the caching appliances 110 and 125.

Software applications generally interact with the primary shard 143 and 153 (i.e., read, update, delete, etc.). Changes made to the primary shard 143 and 153 are then propagated to the replica shard 147 and 157, which is used as a back-up copy. Upon failure of a primary shard 143 and 153, the corresponding replica shard 147 and 157 is then used as the primary.

In the conventional caching appliance 110 and 125, both the primary shard 143 and 153 and replica shard 147 and 157 for the data partitions 140 and 150 are kept in memory 115 and 130, which provides faster access over operations made to non-volatile storage (NVS) 120 and 135 media. While the use of memory 115 and 130 for the primary shard 143 and 153 and the resultant faster access times is the key benefit for using a caching appliance 110 and 125, the storing of the replica shard 147 and 157 in memory 115 and 130 provides no additional benefit, except in the event of a failure of the primary shard 143 and 153.

This conventional configuration of storing the replica shard 147 and 157 in memory 115 and 130 actually decreases the potential capacity of the cache provided by the caching appliance cluster 105 (i.e., uses faster storage medium for back-up purposes). Further, this approach does not ensure the persistence of the replica shard 147 and 157 should the memory 115 and 130 storing the replica shard 147 and 157 fails. In fact, this approach, actually provides no persistence of the state of the data partitions 140 and 150 should the caching appliance cluster 105 fail.

BRIEF SUMMARY

One aspect of the present invention can include a method for improving replication persistence in a caching appliance structure. Such a method can begin when a primary catalog service receives a command to instantiate a data partition. The primary catalog service can manage a collective of caching appliances in a networked computing environment. The data partition can include a primary shard and at least one replica shard. The primary shard of the data partition can be stored within a memory space of a first caching appliance. The at least one replica shard of the data partition can be stored within a non-volatile storage space of a second caching appliance. The first and the second caching appliances can be separate physical devices. The non-volatile storage space can allow, read, and write transactions. The memory space of the second caching appliance that could have been used to store the at least one replica shard can be available for storing primary shards for other data partitions, whereby the capacity of the collective of caching appliances can be increased.

Another aspect of the present invention can include a system for improving replication persistence in a caching appliance structure. Such a system can include data partitions and a cluster of at least two caching appliances. A data partition can represent a logical subset of a dataset, and can include a primary shard and at least one replica shard. A replica shard can be a back-up copy of the primary shard. The cluster of caching appliances can operate within a networked computing environment. A caching appliance can include, as a minimum, a memory space, a non-volatile storage space, and an improved catalog service. The memory space can be configured to act as a cache for the primary shard of a data partition. The non-volatile storage space can store the at least one replica shard of the data partition, and can allow read and write transactions. The improved catalog service can be configured to dynamically manage the storage of shards for the data partitions to the memory space and non-volatile storage space local to the caching appliance. Within the cluster, one improved catalog service can be designated as a primary catalog service that manages shard operations for the entire cluster.

Yet another aspect of the present invention can include a computer program product that includes a computer readable storage medium having embedded computer usable program code. The computer usable program code can be configured to receive a command to instantiate a data partition within a collective of caching appliances in a networked computing environment. A data partition can include a primary shard and at least one replica shard. The computer usable program code can be configured to store the primary shard of the data partition within a memory space of a first caching appliance. The computer usable program code can be further configured to store the at least one replica shard of the data partition within a non-volatile storage space of a second caching appliance. The first and the second caching appliances can be separate physical devices. The memory space of the second caching appliance that could have been used to store the at least one replica shard can be available for storing primary shards for other data partitions, whereby a capacity of the collective of caching appliances can be increased.

BRIEF DESCRIPTION OF THE SEVERAL VIEWS OF THE DRAWINGS

FIG. 6 is a flow chart of a method detailing the handling of the failure of the caching appliance cluster by the improved catalog service in accordance with embodiments of the inventive arrangements disclosed herein.

DETAILED DESCRIPTION

Figure 1:
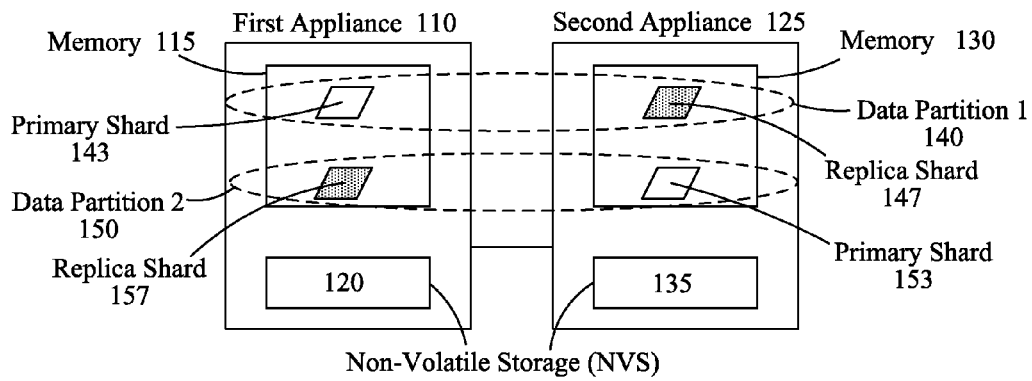
FIG. 1 (PRIOR ART) is a functional diagram illustrating data storage in a conventional caching appliance cluster.

The present invention discloses a solution for improving the overall capacity of a caching appliance cluster as well as the persistence of its stored replica shards. Within the caching appliance cluster, primary shards can be stored in the memory, while replica shards can be stored in non-volatile storage (NVS). Since the replica shards are not stored in memory, the memory space that would have been used is now available for additional primary shards or to increase the size of existing primary shards. Further, in the event of a power failure, replica shards can be available from NVS, allowing for primary shards to be recovered faster.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
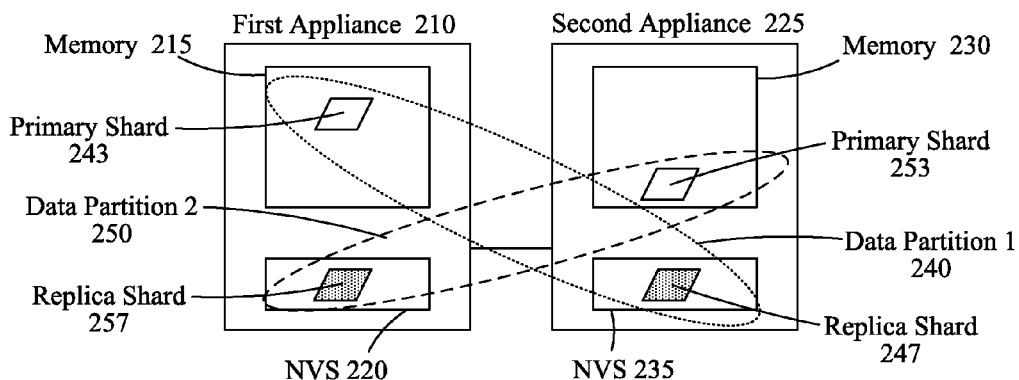
FIG. 2 is a functional diagram illustrating a system that illustrates a data storage approach that improves capacity and data persistence for a caching appliance cluster in accordance with an embodiment of the inventive arrangements disclosed herein.

FIG. 2 is a functional diagram illustrating a system 200 that illustrates a data storage approach that improves capacity and data persistence for a caching appliance cluster 205 in accordance with embodiments of the inventive arrangements disclosed herein. In system 200, the caching appliances 210 and 225 of a caching appliance cluster 205 can be configured to utilize local non-volatile storage (NVS) 220 and 235 for the storage of replica shards 247 and 257.

This approach can improve the capacity of the cache provided by the caching appliance cluster 205 as well as improve the persistence of the replica shards 247 and 257 in the event of memory 215 and 230 failure. In this example, the caching appliance cluster 205 can comprise a first caching appliance 210 and a second caching appliance 225.

The caching appliance cluster 205 can be configured to store the primary shard 243 and 253 of data partitions 240 and 250 in memory 215 and 230 and the replica shard 247 and 257 in NVS 220 and 235. As shown in this example, the primary shard 243 of data partition 1 240 can be stored in the memory 215 of the first caching appliance 210 and the replica shard 247 can be stored in the NVS 235 of the second caching appliance 225. For data partition 2 250, the storage configuration can be reversed with the primary shard 253 stored in the memory 230 of the second caching appliance 225 and the replica shard 257 stored in the NVS 220 of the first caching appliance 210.

By using the NVS 220 and 235 of the caching appliances 210 and 225, the space in memory 215 and 230 that would have been allocated for storing the replica shard 247 and 257 can, instead, be allocated for storing the primary shard of another data partition. Thus, the storage capacity, either in terms of the size or quantity of primary shards 243 and 253, of the caching appliance cluster 205 can be increased.

In this embodiment, replication operations performed by the caching appliance cluster 205 can be simply modified to direct updates of the primary shard 243 and 253 to the location of the replica shard 247 and 257 in NVS 220 and 235. That is, the basic function of replication within the caching appliance cluster 205 can remain the same (i.e., the replica shard 247 and 257 is still updated when changes occur to the primary shard 243 and 253), except in terms of the physical location of the replica shard 247 and 257.

Further, since the replica shards 247 and 257 are stored in NVS 220 and 235, which do not require power to provide persistent storage, the data contained in the replica shards 247 and 257 can persist through any failures experienced by the caching appliance cluster 205, especially those failures that affect memory 215 and 230.

For example, in the event that the caching appliance cluster 205 loses power, all the primary shards 243 and 253 stored in memory 215 and 230 can be lost (i.e., no power to memory 215 and 230 results in data loss), but the replica shards 247 and 257 can persist. This can result in a faster recovery for the contents of the cached data because new primary shards 243 and 253 can be automatically created from the persisted replica shards 247 and 257.

Should a conventional caching appliance cluster 105, as in system 100 of FIG. 1, experience such a power failure, no replica shards 147 and 157 would be available to create new primary shards 143 and 153. The caching appliance cluster 105 would need to re-create each data partition 140 and 150 from the underlying data source, which can require more time, delaying the overall recovery of the cache provided by the caching appliance cluster 105.

Figure 3:
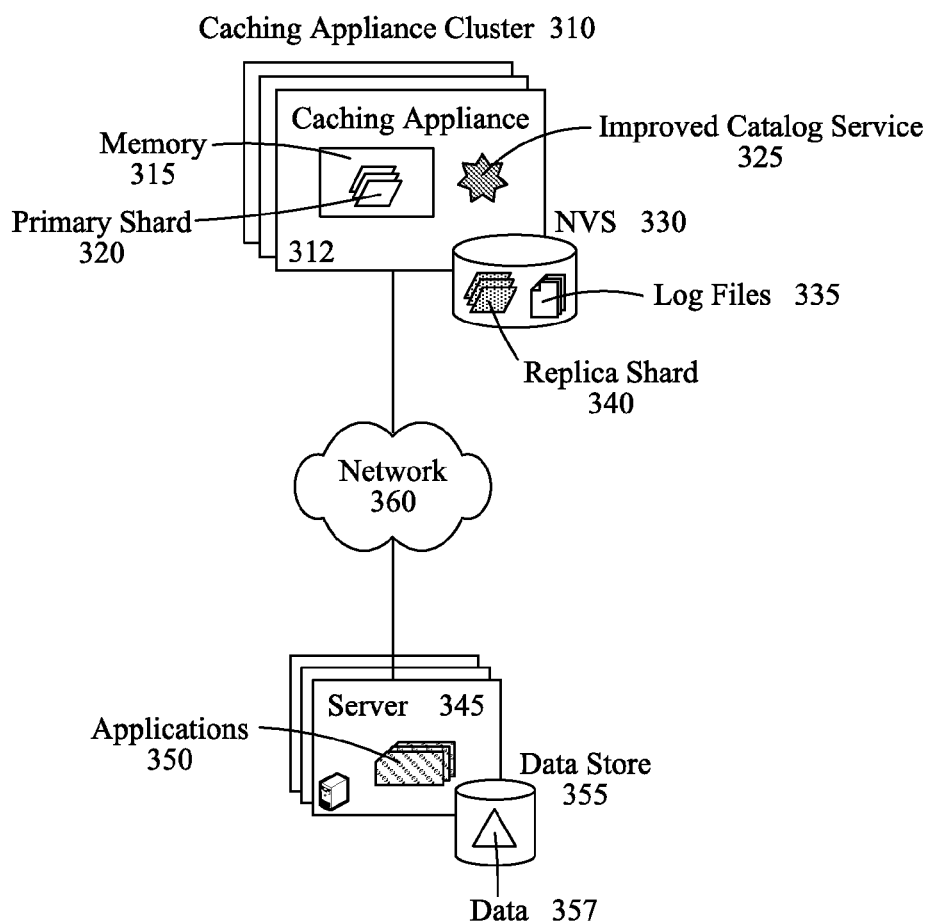
FIG. 3 is a schematic diagram of a system that implements the improved data storage approach for a caching appliance cluster within a networked computing environment in accordance with an embodiment of the inventive arrangements disclosed herein.

FIG. 3 is a schematic diagram of a system 300 that implements the improved data storage approach for a caching appliance cluster 310 within a networked computing environment 305 in accordance with embodiments of the inventive arrangements disclosed herein. System 300 can represent an embodiment of system 200.

In system 300, the networked computing environment 305 can represent a closed system of computing devices interconnected by a network 360. That is, the computing devices can be known within the networked computing environment 305 and measures can be taken to restrict access to unauthorized computing devices, particularly when the network 360 includes connectivity to the Internet.

For example, the networked computing environment 305 can represent an enterprise computing environment where an organization's computing devices (e.g., computers, servers, data stores, etc.) can communicate with each other over an internal network 360 (i.e., local area network (LAN)).

The components of the networked computing environment 305 can be geographically dispersed and follow various standard networking practices and/or configurations. Further, to support these practices/configurations, network 360 can include additional communication and/or connectivity mechanisms.

For example, an organization with a global e-commerce business can have computing devices that support their e-commerce business in various geographic areas. These geographically separated computing devices can be components of networked computing environments 305 local to their area and those local networked computing environments 305 can be connected to each other to form the organization's overall networked computing environment 305.

Since the networked computing environment 305 can comprise a variety of components and/or configurations, system 300 can illustrate only those components directly involved with this embodiment of the present disclosure. As such, the networked computing environment 305 can comprise a caching appliance cluster 310 connected to a variety of servers 345 over a network 360.

A server 345 can be hardware and/or software components configured to provide access to applications 350 and/or data 357 like an application server or file server. Data 357 contained in the data store 355 of a server 345 can be the data source for the caching appliance cluster 310.

For example, data 357 can represent an inventory database and the inventory data of frequently-requested products can be stored in the caching appliance cluster 310 for faster access.

The caching appliance cluster 310 can comprise multiple (at least two) interconnected caching appliances 312. Since the concept and functionality of caching appliances 312 are known by those versed in the art, only those components and/or functions directly related to this embodiment of the present disclosure shall be discussed herein.

Each caching appliance 312 can include memory 315, an improved catalog service 325, and non-volatile storage (NVS) 330. Memory 315 can correspond to a storage medium, such as random-access memory (RAM) (e.g., DRAM, SRAM), used as the cache to provide fast access to primary shards 320. A primary shard 320 can represent the main or active copy of the frequently-used data.

The NVS 330 can represent a persistent storage medium that does not require power to retain stored data, unlike memory 315. Examples of NVS 330 can include, but are not limited to, a hard disk drive, a solid-state drive, ferroelectric random access memory (FeRAM), flash memory, and the like. The NVS 330 can also be a collection of such devices like a redundant array of independent disks (RAID).

The NVS 330 can be an internal component of the caching appliance 312 (i.e., an internal hard drive) or can be an external device or collection of devices to which the caching appliance 312 is connected to locally or over the network 360 (i.e., a storage area network (SAN)).

The NVS 330 of the caching appliances 312 can be used to store replica shards 340 and, optionally, log files 335. A replica shard 340 can represent a back-up copy of a corresponding primary shard 320. A primary shard 320 can have one or more replica shards 340 that can be stored on multiple caching appliances 312.

Modifications to a primary shard 320 can be propagated to its replica shards 340 either synchronously or asynchronously. Operational messages for the caching appliances 312 can be recorded in the log files 335.

The improved catalog service 325 can represent the software application that manages storage of the primary shards 320 and replica shards 340 for a caching appliance 312.

Depending upon the specific implementation and/or configuration of the caching appliance 312, the improved catalog service 325 can operate from memory 315, and/or NVS 330, and can be firmware.

Unlike the catalog service utilized by a conventional caching appliance, the improved catalog service 325 can be configured to handle replica shards 340 stored in NVS 330. Therefore, an improved catalog service 325 can be configured to store/modify/delete replica shards 340 in NVS 330 as well as load replica shards 340 from NVS 330 to memory 315 in the event of a failure.

It should be noted that the improved catalog service 325 can include other functionality of typical catalog services without modification. For example, the improved catalog service 325 can communicate with the improved catalog services 325 of other caching appliances 312 in the same manner as conventional catalog services.

As it is known in the art, each caching appliance 312 can have a local improved catalog service 325 and that, in a caching appliance cluster 310, one improved catalog service 325 can be designated as a primary improved catalog service 325. The purpose of the primary improved catalog service 325 can be to act as the improved catalog service 325 at the cluster-level (i.e., the primary improved catalog service 325 manages all the local improved catalog services 325).

Thus, the primary improved catalog service 325 can determine how to store primary 320 and replica shards 340 within the caching appliance cluster 310 (i.e., dispersing shard for high availability).

A caching appliance 312 can be a discrete physical device having the components shown in system 300, such as the WEBSPHERE DATAPOWER XC10 APPLIANCE. Alternately, the caching appliance 312 can be a server 345 configured to act as a caching appliance.

For example, a server 345 can run WEBSPHERE EXTREME SCALE 350 and function as a dynamic cache or in-memory data grid.

Network 360 can include any hardware/software/and firmware necessary to convey data encoded within carrier waves. Data can be contained within analog or digital signals and conveyed though data or voice channels. Network 360 can include local components and data pathways necessary for communications to be exchanged among computing device components and between integrated device components and peripheral devices. Network 360 can also include network equipment, such as routers, data lines, hubs, and intermediary servers which together form a data network, such as the Internet. Network 360 can also include circuit-based communication components and mobile communication components, such as telephony switches, modems, cellular communication towers, and the like. Network 360 can include line based and/or wireless communication pathways.

As used herein, presented data store 355 can be a physical or virtual storage space configured to store digital information. Data store 355 can be physically implemented within any type of hardware including, but not limited to, a magnetic disk, an optical disk, a semiconductor memory, a digitally encoded plastic memory, a holographic memory, or any other recording medium. Data store 355 can be a stand-alone storage unit as well as a storage unit formed from a plurality of physical devices. Additionally, information can be stored within data store 355 in a variety of manners. For example, information can be stored within a database structure or can be stored within one or more files of a file storage system, where each file may or may not be indexed for information searching purposes. Further, data store 355 can utilize one or more encryption mechanisms to protect stored information from unauthorized access.

Figure 4:
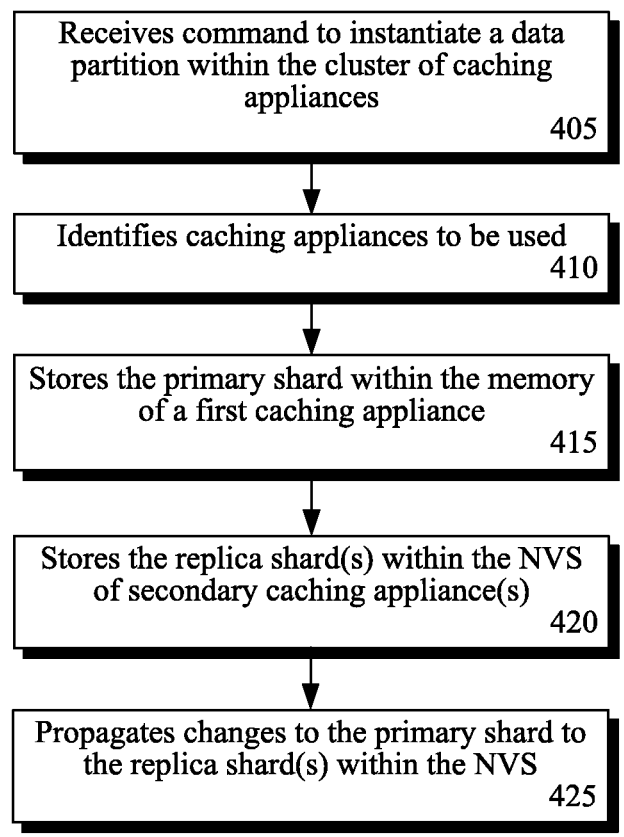
FIG. 4 is a flow chart of a method describing the basic functionality of an improved catalog service in accordance with embodiments of the inventive arrangements disclosed herein.

FIG. 4 is a flow chart of a method 400 describing the basic functionality of an improved catalog service in accordance with embodiments of the inventive arrangements disclosed herein. Method 400 can be performed within the context of systems 200 and/or 300.

Method 400 can begin in step 405 where the improved catalog service can receive a command to instantiate a data partition within a cluster of caching appliances. The caching appliances to be used for the data partition can then be identified in step 410.

In step 415, the primary shard of the data partition can be stored within the memory of a first caching appliance. The replica shard can then be stored within the NVS of a second caching appliance in step 420. When a primary shard has multiple replica shards, step 420 can be performed for each replica shard and can store the replica shards on separate caching appliances.

As the improved catalog service handles transactions for the primary shards, any modifications to the data of the primary shards can be propagated to the replica shards in NVS in step 425.

Figure 5:
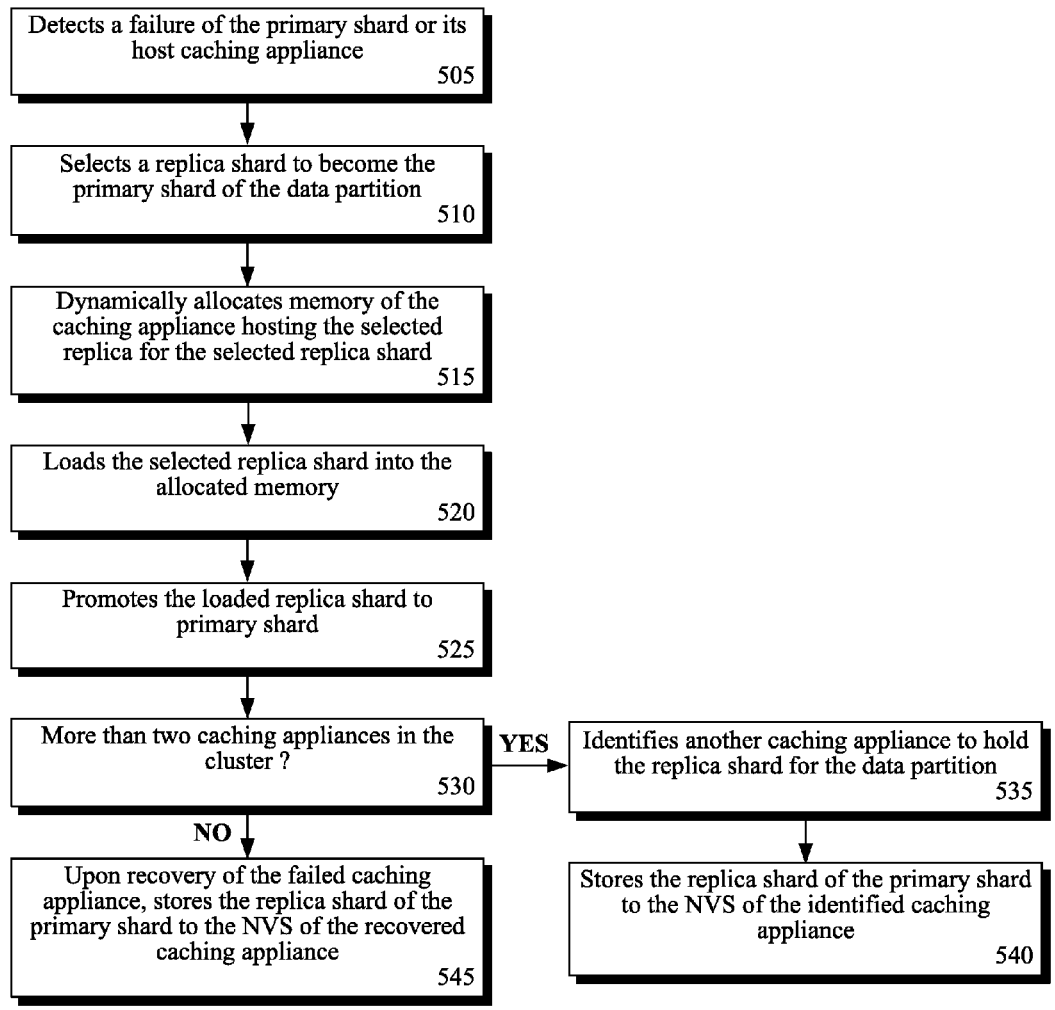
FIG. 5 is a flow chart of a method detailing the handling of the failure of a primary shard or caching appliance by the improved catalog service in accordance with embodiments of the inventive arrangements disclosed herein.

FIG. 5 is a flow chart of a method 500 detailing the handling of the failure of a primary shard or caching appliance by the improved catalog service in accordance with embodiments of the inventive arrangements disclosed herein. Method 500 can be performed within the context of systems 200 and/or 300, and/or in conjunction with method 400.

Method 500 can begin in step 505 where the improved catalog service can detect the failure of a primary shard or it hosting caching appliance (i.e., the first caching appliance). A replica shard can be selected to become the primary shard of the data partition in step 510.

In step 515, memory of the caching appliance hosting the selected replica shard can be dynamically allocated for the selected replica shard. It can be assumed that the selection process of step 510 takes the available memory space of the caching appliance into account.

The selected replica shard can be loaded into the allocated memory in step 520. In step 525, the loaded replica shard can be promoted to primary shard. Step 525 can utilize the existing mechanism for designating shards as primary or replica.

In step 530, it can be determined if there are more than two caching appliances in the cluster. When there are only two caching appliances in the cluster, step 545 can execute where, upon recovery of the failed caching appliance, the replica shard for the primary shard can be stored in the NVS of the recovered caching appliance.

When there are more than two caching appliances in the cluster, another caching appliance in the cluster can be identified to store the replica shard of the data partition in step 535. In step 540, the replica shard can be stored in the NVS of the identified caching appliance.

FIG. 6 is a flow chart of a method 600 detailing the handling of the failure of the caching appliance cluster by the improved catalog service in accordance with embodiments of the inventive arrangements disclosed herein. Method 600 can be performed within the context of systems 200 and/or 300, and/or in conjunction with methods 400 and/or 500.

Method 600 can begin in step 605 where the caching appliance cluster can experience a failure that results in the loss of primary shards stored in memory (i.e., a power failure to the cluster). The caching appliance cluster can recover from the failure in step 610.

In step 615, the primary improved catalog service can re-instantiate the lost primary shards. It is important to note that, unlike in a conventional caching appliance cluster, the improved catalog service does not need to completely re-instantiate the data partition since the replica shards persisted the failure. In a conventional caching appliance cluster, the replica shards would have also been lost, requiring the primary shards to be re-created from their data sources.

Memory of each caching appliance hosting a replica shard can then be dynamically allocated in step 620. In step 625, the replica shards can be loaded into the allocated memory. The loaded replica shards can be promoted to primary shards in step 630.

In step 635, other caching appliances can be identified to hold replica shards for the data partitions. Replica shards can be stored in the NVS of the identified caching appliances in step 640.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for improving replication persistence and storage capacity in a caching appliance structure comprising:
    a plurality of data partitions each representing a logical subset of a dataset, wherein each data partition comprises a primary shard and at least one replica shard, wherein the at least one replica shard is a back-up copy of the primary shard;
    a plurality of caching appliances configured as a cluster within a networked computing environment, wherein a caching appliance in the cluster at least comprises:
        a memory space configured to act as a cache; and
        a non-volatile storage space, wherein the non-volatile storage space allows read and write transactions; and
    a primary catalog service configured to manage shard operations for the cluster in its entirety, wherein the primary catalog service is configured to:
        store the primary shard associated with a first caching appliance in a memory space of the first caching appliance; and
        store the replica shard associated with the first caching appliance in a non-volatile storage space of a second caching appliance of the at least two caching appliances, wherein the first caching appliance and the second caching appliance are different physical devices;
        in response to detection of a failure of the first caching appliance:
            load the replica shard associated with the first caching appliance into a memory space of the second caching appliance and directly promote the loaded replica shard to a primary shard; and
            access the memory space of the second caching appliance for performing operations on the promoted primary share for the duration of failure of the first caching appliance.

2. The system of claim 1, wherein the caching appliance is a computing device having components configured to only perform caching functions for the plurality of data partitions.

3. The system of claim 1, wherein the caching appliance is a server having additional components configured to perform a plurality of computing functions in addition to caching functions for the plurality of data partitions.

4. The system of claim 1, wherein the cluster of caching appliances implements an in-memory data grid for the networked computing environment.

5. The system of claim 1, wherein the primary catalog is configured to:
    detect a storage configuration of a first data partition and a second data partition on a third caching appliance and a fourth caching appliance in the cluster, wherein the third caching appliance and the fourth caching appliance are different physical devices, wherein the detected storage configuration comprises:
        a primary shard of the first data partition and a replica shard of the second data partition are stored in a memory space of the third caching appliance; and
        a primary shard of the second data partition and a replica shard of the first data partition are stored in a memory space of the fourth caching appliance; and
    modify the detected storage configuration, wherein the modifying comprises:
        moving the replica shard of the first data partition to a non-volatile storage space of the fourth caching appliance and the replica shard of the second data partition to a non-volatile storage space of the third caching appliance, wherein the moving improves the replication persistence; and
        storing a primary shard of fifth data partition in a memory space of one of the first caching appliance and the second caching appliance, wherein the storing improves storage capacity of memory space of a caching appliance in the cluster for storing primary shards.

6. The system of claim 1, wherein the non-volatile storage space is an external data storage device connected to the caching appliance.

7. The system of claim 1, further comprising:
    a data store connected to the networked computing environment and accessible by the plurality of caching appliances that contains the dataset that supports the plurality of data partitions.

8. The system of claim 1, wherein the non-volatile storage space for storing the at least one replica shard is external to the caching appliance.

9. A computer program product comprising a non-transitory computer readable storage medium having computer usable program code embodied therewith, the computer usable program code comprising:
    computer usable program code of the non-transitory computer readable storage medium configured to receive a command to instantiate a data partition within a collective of caching appliances in a networked computing environment, wherein said data partition comprises a primary shard and at least one replica shard;
    computer usable program code of the non-transitory computer readable storage medium configured to store the primary shard of the data partition within a memory space of a first caching appliance;

computer usable program code of the non-transitory computer readable storage medium configured to store the at least one replica shard of the data partition within a non-volatile storage space of a second caching appliance, wherein the first and the second caching appliances are separate physical devices, whereby memory space of the second caching appliance that could have been used to store the at least one replica shard is available for storing primary shards for other data partitions, whereby a capacity of the collective of caching appliances is increased;

computer usable program code of the non-transitory computer readable storage medium configured to in response to detection of a failure of the first caching appliance:

(A) load the replica shard associated with the first caching appliance into a memory space of the second caching appliance and directly promote the loaded replica shard to a primary shard; and (B) access the memory space of the second caching appliance for performing operations on the promoted primary share for the duration of failure of the first caching appliance; and computer usable program code of the non-transitory computer readable storage medium configured to record operational messages for the collective of caching appliances by a primary catalog service, wherein the primary catalog service is configured to manage shard operations for the collective of caching appliances in its entirety.

10. The computer program product of claim 9, further comprising:

computer usable program code of the non-transitory computer readable storage medium configured to, upon detection of a failure of at least one of the primary shard and the first caching appliance, select the at least one replica shard stored in the non-volatile storage of the second caching appliance for promotion to a primary shard;

computer usable program code of the non-transitory computer readable storage medium configured to load the selected replica shard from the non-volatile storage space into a memory space of the second caching appliance, wherein said memory space is dynamically allocated for the selected replica shard;

computer usable program code of the non-transitory computer readable storage medium configured to designate the replica shard loaded into the memory space of the second caching appliance as the primary shard of the data partition, wherein the first caching appliance is disassociated from the data partition; and computer usable program code of the non-transitory computer readable storage medium configured to access the memory space of the second caching appliance for performing operations on the promoted primary share for the duration of failure of the first caching appliance.

11. The computer program product of claim 10, wherein, when the collective of caching appliances comprises two caching appliances, said method further comprises:

computer usable program code of the non-transitory computer readable storage medium configured to, upon recovery from the failure by the first caching appliance, store the at least one replica shard for the data partition in a non-volatile storage space of the first caching appliance.

12. The computer program product of claim 10, wherein, when the collective of caching appliances comprises more than two caching appliances, said method further comprises:

computer usable program code of the non-transitory computer readable storage medium configured to identify a third caching appliance to house the at least one replica shard for the data partition, wherein the second and third caching appliances are separate physical devices; and computer usable program code of the non-transitory computer readable storage medium configured to store the at least one replica shard for the data partition in the non-volatile storage space of the third caching appliance.

13. The computer program product of claim 9, wherein the collective of caching appliances implements an in-memory data grid that supports data coherence among a plurality of interconnected JAVA processes.

14. The computer program product of claim 9, further comprising:

computer usable program code of the non-transitory computer readable storage medium configured to handle a transaction for the primary shard of the data partition, wherein data of the primary shard is modified within the memory space of the first caching appliance; and computer usable program code of the non-transitory computer readable storage medium configured to propagate the transaction to the at least one replica shard of the data partition, wherein data of the at least one replica shard is modified within the non-volatile storage space of the second caching appliance.

15. A computer system for improving replication persistence in a caching appliance structure, the computer system comprising:

one or more processors, one or more computer-readable memories and one or more non-transitory computer-readable storage devices;

program instructions, stored on at least one of the one or more storage devices for execution by at least one of the one or more processors via at least one of the one or more memories, to receive a command to instantiate a data partition by a primary catalog service that manages a collective of caching appliances in a networked computing environment, wherein said data partition comprises a primary shard and at least one replica shard;

program instructions, stored on at least one of the one or more storage devices for execution by at least one of the one or more processors via at least one of the one or more memories, to store the primary shard of the data partition within a memory space of a first caching appliance;

program instructions, stored on at least one of the one or more storage devices for execution by at least one of the one or more processors via at least one of the one or more memories, to store the at least one replica shard of the data partition within a non-volatile storage space of a second caching appliance, wherein the first and the second caching appliances are separate physical devices, and, wherein the non-volatile storage space allows read and write transactions, whereby memory space of the second caching appliance that could have been used to store the at least one replica shard is available for storing primary shards for other data partitions, whereby a capacity of the collective of caching appliances is increased;

program instruction, stored on at least one of the one or more storage devices for execution by at least one of the one or more processors via at least one of the one or more memories, to in response to detection of a failure of the first caching appliance:

(A) load the replica shard associated with the first caching appliance into a memory space of the second caching appliance and directly promote the loaded replica shard to a primary shard; and
(B) access the memory space of the second caching appliance for performing operations on the promoted primary share for the duration of failure of the first caching appliance; and program instructions, stored on at least one of the one or more storage devices for execution by at least one of the one or more processors via at least one of the one or more memories, to record operational messages for the collective of caching appliances by a primary catalog service, wherein the primary catalog service is configured to manage shard operations for the collective of caching appliances in its entirety.

16. The computer system of claim 15, further comprising:
program instructions, stored on at least one of the one or more storage devices for execution by at least one of the one or more processors via at least one of the one or more memories, to, upon detection of a failure of at least one of the primary shard and the first caching appliance by the primary catalog service, select the at least one replica shard stored in the non-volatile storage of the second caching appliance for promotion to a primary shard;
program instructions, stored on at least one of the one or more storage devices for execution by at least one of the one or more processors via at least one of the one or more memories, to load the selected replica shard from the non-volatile storage space into a memory space of the second caching appliance, wherein said memory space is dynamically allocated for the selected replica shard;
program instructions, stored on at least one of the one or more storage devices for execution by at least one of the one or more processors via at least one of the one or more memories, to designate the replica shard loaded into the memory space of the second caching appliance as the primary shard of the data partition, wherein the first caching appliance is disassociated from the data partition; and
program instructions, stored on at least one of the one or more storage devices for execution by at least one of the one or more processors via at least one of the one or more memories, to access the memory space of the second caching appliance for performing operations on the promoted primary share for the duration of failure of the first caching appliance.

17. The computer system of claim 15, further comprising:
program instructions, stored on at least one of the one or more storage devices for execution by at least one of the one or more processors via at least one of the one or more memories, to upon recovery from the failure by the first caching appliance and when the collective of caching appliances comprises two caching appliances, store the at least one replica shard for the data partition in a non-volatile storage space of the first caching appliance.

18. The computer system of claim 16, further comprises:
program instructions, stored on at least one of the one or more storage devices for execution by at least one of the one or more processors via at least one of the one or more memories, to, when the collective of caching appliances comprises more than two caching appliances, identify a third caching appliance to house the at least one replica shard for the data partition, wherein the second and third caching appliances are separate physical devices; and
program instructions, stored on at least one of the one or more storage devices for execution by at least one of the one or more processors via at least one of the one or more memories, to store the at least one replica shard for the data partition in the non-volatile storage space of the third caching appliance, wherein the non-volatile storage space allows read and write transactions.

19. The computer system of claim 15, further comprising:
program instructions, stored on at least one of the one or more storage devices for execution by at least one of the one or more processors via at least one of the one or more memories, to handle of a transaction for the primary shard of the data partition by the primary catalog service, wherein data of the primary shard is modified within the memory space of the first caching appliance; and
program instructions, stored on at least one of the one or more storage devices for execution by at least one of the one or more processors via at least one of the one or more memories, to propagate the transaction to the at least one replica shard of the data partition, wherein data of the at least one replica shard is modified within the non-volatile storage space of the second caching appliance.

20. The system of claim 15, wherein the primary catalog service is configured for deleting the replica shard of the first data partition from the non-volatile storage space of the second caching appliance.

* * * * *